United States Patent [19] [11] 3,879,743
Wick et al. [45] Apr. 22, 1975

[54] MINIATURE STILL CAMERA WITH VIEWFINDER

[75] Inventors: Richard Wick; Alfred Winkler, both of Munich; Peter Lermann, Narring, all of Germany

[73] Assignee: AGFA-Gevaert Aktiengesellschaft, Leverkusen, Germany

[22] Filed: June 19, 1973

[21] Appl. No.: 371,567

[30] Foreign Application Priority Data
June 27, 1972 Germany............................ 2231414

[52] U.S. Cl.................................. 354/225; 354/275
[51] Int. Cl. ........................................... G03b 19/04
[58] Field of Search ....... 95/42, 31 CA, 31 R, 11 L; 354/275, 219, 224, 225

[56] References Cited
UNITED STATES PATENTS

| | | | |
|---|---|---|---|
| 2,043,539 | 6/1936 | Harrison et al. | 95/42 X |
| 3,024,714 | 3/1962 | Keznickl | 95/44 R |
| 3,043,181 | 7/1962 | Brown et al. | 95/42 X |
| 3,282,178 | 11/1966 | Nelson | 95/42 X |
| 3,385,190 | 5/1968 | Sho et al. | 95/42 |
| 3,523,496 | 8/1970 | Neuvine | 95/31 CA |
| 3,624,829 | 11/1971 | Crone | 95/42 |
| 3,690,235 | 9/1972 | Ainslie et al. | 95/31 R |

Primary Examiner—Samuel S. Matthews
Assistant Examiner—E. M. O'Connor
Attorney, Agent, or Firm—Michael S. Striker

[57] ABSTRACT

A miniature single-lens reflex still camera for use with cassettes of the type having forwardly extending supply and takeup sections and a flat intermediate section which is provided with a film window has a base objective mounted in the camera body in the space between the supply and takeup sections and in front of the film window of a properly inserted cassette. The supply section is adjacent to one side wall and the takeup section is spaced apart from the other side wall of the body to provide room for the eyepiece of a viewfinder. The eyepiece is adjacent to the other side wall of the body and the remaining optical elements of the viewfinder are located behind the front wall and include two mirrors the first of which deflects a portion of incoming scene light through an angle of 90 degrees and the second of which deflects a part of the thus deflected portion of light into the eyepiece. The remaining part of the deflected light portion passes through the second mirror and reaches a photosensitive transducer forming part of an exposure control including a diaphragm located in front of the base objective. A compartment for one or more batteries is provided in the body in front of the supply section of the cassette.

10 Claims, 3 Drawing Figures

MINIATURE STILL CAMERA WITH VIEWFINDER

BACKGROUND OF THE INVENTION

The present invention relates to still cameras in general, and more particularly to improvements in still cameras which utilize one-piece cassettes or containers for storage of unexposed and exposed film frames. Still more particularly, the invention relates to improvements in single-lens reflex still cameras which can be used with the just-mentioned cassettes and are further provided with a viewfinder, preferably a viewfinder having optical elements which deflect a portion of incoming scene light through two successive 90° angles before the scene light reaches the eyepiece.

It is already known to provide in the housing or body of a still camera a space adapted to receive a one-piece cassette for storage of exposed and unexposed film frames and to install in the body a partially light-transmitting mirror which is located in front of the objective and serves to deflect a portion of incoming scene light through 90° whereby the thus deflected portion of light impinges upon a second mirror which deflects it through 90° and into the eyepiece of the viewfinder. The cassette normally comprises a first section which serves for storage of unexposed film frames, a second section which stores exposed film frames, and a flat intermediate section which is provided with a film window located behind the objective and serving to admit light against the foremost unexposed film frame. Such cassettes are often used for storage of roll film having miniature film frames. The dimensions of the cassette are determined by the format (width) and by the length of the film therein.

A drawback of presently known cameras which employ cassettes of the above outlined character is that their housing or body is much larger than warranted by the dimensions of the cassettes. Moreover, the distribution of camera parts in the body is not entirely satisfactory so that such parts, together with the space which is required for reception of the cassette, occupy much more room than would normally be expected in view of their relative simplicity and the format and/or length of photographic film in the cassette. Furthermore, the presently known still cameras which employ one-piece cassettes for exposed and unexposed film portions and viewfinders are not sufficiently versatile so that they are not favored by advanced amateur photographers.

SUMMARY OF THE INVENTION

An object of the invention is to provide a novel and improved still camera wherein the interior of the camera body is utilized with a much higher degree of economy than in heretofore known still cameras and which in spite of its compactness and light weight, is more versatile than heretofore known compact or miniature still cameras.

Another object of the invention is to provide a novel distribution of the space for a one-piece cassette for exposed and unexposed film frames, of the parts of automatic exposure control means, of a viewfinder and of a base objective in a compact or miniature still camera.

A further object of the invention is to provide a single-lens reflex still camera with a novel and improved viewfinder.

An additional object of the invention is to provide a miniature or compact still camera wherein the width of the housing or body is determined practically exclusively by the dimensions of the cassette and by the eyepiece of the viewfinder.

Still another object of the invention is to provide a novel and improved mounting for the base objective in a still camera for use with one-piece cassettes or containers for exposed and unexposed film frames.

A further object of the invention is to provide a still camera of the above outlined character with novel and improved means for movably and/or removably supporting one or more supplemental lenses.

An additional object of the invention is to provide a miniature still camera with compact exposure control means whose parts are distributed in such a way that they do not contribute to the bulk of the camera body.

The invention is embodied in a still camera, particularly in a compact or miniature still camera, which comprises a housing or body having a front wall provided with a light-admitting opening, a rear wall and two side walls, a film container or cassette which is removably installed in the housing and has a first section adjacent to one of the side walls, a second section spaced apart from both side walls, and a preferably thin and flat intermediate section which is located between the first and second sections adjacent to the rear wall and has a film window facing the light-admitting opening in the front wall, a base objective, and a viewfinder.

One of the first and second sections of the container serves for the storage of unexposed film and the other of the first and second sections serves for the storage of exposed film frames. These sections define in front of the film window a chamber which is open toward the front wall, and the base objective is at least partially received in the chamber in front of the intermediate section of the container.

The viewfinder has an eyepiece which is mounted in the housing between the second section of the container and the other side wall, and optical elements serving to direct into the eyepiece a portion of light which is admitted into the housing by way of the light-admitting opening in front of the base objective.

The optical elements of the viewfinder preferably include a first mirror which is located between the light-admitting opening and the base objective and has a surface which makes with the axis of the objective an acute angle (preferably 45° to deflect a portion of incoming scene light in a direction toward the other side wall of the housing, and a second mirror which is mounted adjacent to the other side wall in the path of the deflected light portion and has a surface serving to direct at least a part of the deflected light portion into the eyepiece. The surface of the second mirror is preferably positioned in the housing in such a way that it deflects the aforementioned part of the deflected light portion through an angle of 90°.

The novel features which are considered as characteristic of the invention are set forth in particular in the appended claims. The improved still camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
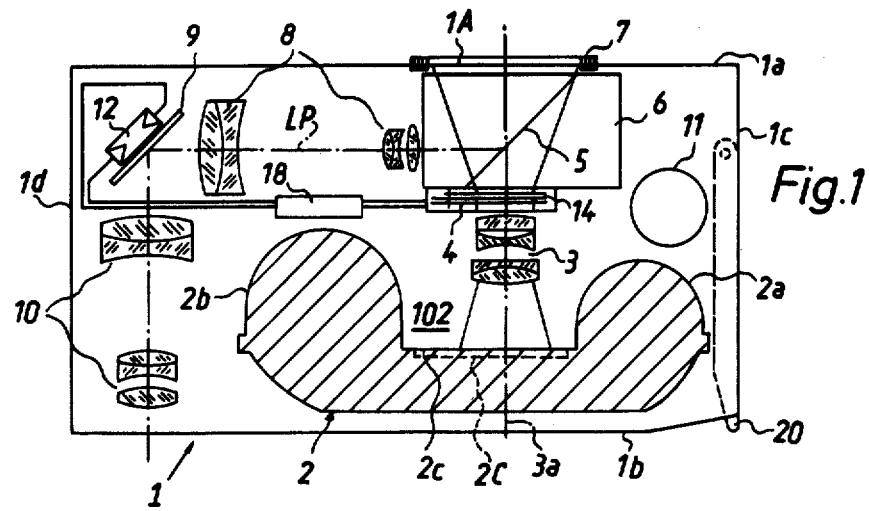
FIG. 1 is a diagrammatic horizontal sectional view of a still camera which embodies the invention.

The single-lens reflex still camera of FIG. 1 comprises a housing or body 1 having parallel front and rear walls 1a and 1b, and two side walls 1c, 1d. The interior of the housing 1 is provided with a space for a so-called "Rapid" cassette or container 2 for a roll of photographic film. The cassette 2 comprises a substantially cylindrical first section 2a which stores unexposed film, a substantially cylindrical second section 2b which stores exposed film frames, and a flat plate-like intermediate section 2c which extends between the sections 2a, 2b adjacent to the rear wall 1b and has in its front panel a window 2C for the foremost unexposed film frame. The film window 2C faces a light-admitting opening 1A provided in the front wall 1a and is located immediately behind a chamber 102 defined by those portions of the sections 2a, 2b which extend forwardly beyond the front panel of the intermediate section 2c. The latter defines a narrow channel wherein the film can be transported from the section 2a into the section 2b by a conventional film transporting mechanism which preferably includes a pivotable film advancing lever 20.

At least a portion of a base objective 3 is installed in the chamber 102 between the front portions of the sections 2a, 2b to thereby contribute to flatness and compactness of the housing 1. The format of film frames in the cassette 2 is assumed to be small, and the focal length of the objective 3 is short so that the latter need not extend forwardly beyond the front wall 1a. It will be noted that the section 2a of the cassette 2 is closely adjacent to the right-hand side wall 1c and that the section 2a is spaced apart from the side walls 1c, 1d but is preferably nearer to the side wall 1d.

The exposure control system of the still camera comprises an adjustable diaphragm 4 which is mounted in front of the base objective 3 and means for automatically adjusting the aperture size which is furnished by the diaphragm 4 as a function of scene brightness. Such adjusting means includes a conventional electric circuit 18 mounted in the housing 1 in front of the section 2b and a photosensitive transducer (e.g., a resistor) 12 which is installed in the housing 1 in the corner between the walls 1a and 1d.

Figure 2:
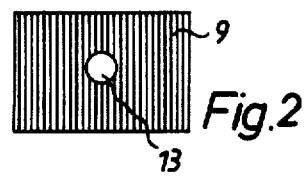
FIG. 2 is a front elevational view of the second mirror of the viewfinder.

The viewfinder of the still camera comprises an eyepiece 10 which is installed in the housing 1 adjacent to the side wall 1d, i.e., between the side wall 1d and the second section 2b of the cassette 2. The viewfinder further includes a number of optical elements 5, 6, 8 and 9 which are mounted behind the front wall 1a but forwardly of the cassette 2 and electric circuit 18 of the exposure control system. The optical element 5 is a mirror which is mounted between the light-admitting opening 1A and the diaphragm 4 and has a surface which makes with the axis 3a of the objective 3 an acute angle, preferably an angle of 45°. The mirror 5 may be a partly light-reflecting and partly light-transmitting type so that a portion of incoming scene light can reach the objective 3 and the remaining portion LP of such light is deflected through an angle of 90° to be deflected again by the surface of a second mirror 9 of the viewfinder. The second mirror 9 reflects at least a part of the light portion LP through an angle of 90° and into the eyepiece 10. The other part of the light portion LP can pass through the mirror 9 and impinges on the photoelectric transducer 12 of the exposure control system so that the transducer can cause the circuit 18 to adjust the aperture size defined by the diaphragm 4 as a function of changes in scene brightness. The mirror 9 may have a surface which makes with the path for the light portion LP an angle of 45° and is practically entirely light-reflecting save for a small opening 13 (see FIG. 2) which is dimensioned to admit light to the light-sensitive surface of the transducer 12.

The mirror 5 may include a totally light-reflecting first portion (e.g., along its edges) and a totally light-transmitting second portion (the central portion) whereby the first portion reflects the light portion LP toward the mirror 9 and the second portion allows scene light to reach the objective 3. Any other suitable optical elements can be used in place of the mirrors 5 and 9 as long as they are capable of allowing some light to reach the objective 3, some light to reach the transducer 12, and some light to reach the eyepiece 10 of the viewfinder. The exact design of the optical elements 8 between the mirrors 5 and 9 forms no part of the invention.

The mirror 5 is installed in a prism 6 which is mounted in the housing 1 behind the light-admitting opening 1A.

The front wall 1a of the housing 1 is connected with a ring-shaped coupling member 7 which can be connected with supplemental lenses. The diameter of the light-admitting opening 1A is determined by the angle of the base objective 3 and influences the image angle of the deflected light portion LP. The width of the housing 1 is determined mainly by the width of the cassette 2 and by the diameter of the eyepiece 10 of the viewfinder. The depth of the housing 1 is determined almost exclusively by the thickness of the cassette 2 and the thickness of the prism 6 for the mirror 5. All other parts of the camera are installed in the spaces which are available in front of the cassette 2 and between the side wall 1d and section 2b.

The housing 1 further defines a compartment 11 which can receive one or more batteries or analogous sources of electrical energy for the electric circuit 18 of the exposure control system. The compartment 11 is located in front of the section 2a and rearwardly and to the right of the mirror 5, as viewed in FIG. 1. Since the circuit 18 occupies very little room, it can be readily installed between the optical elements 8 of the viewfinder and the section 2b of the cassette 2. The reference character 14 denotes a shutter which is installed in the housing 1 between the diaphragm 4 and the prism 6. This shutter can be a simple mechanically actuatable shutter which can furnish only one or two exposure times, or a more sophisticated electronically controlled shutter which forms part of the automatic exposure control system and is designed to furnish exposure times whose duration is a function of scene brightness.

Figure 3:
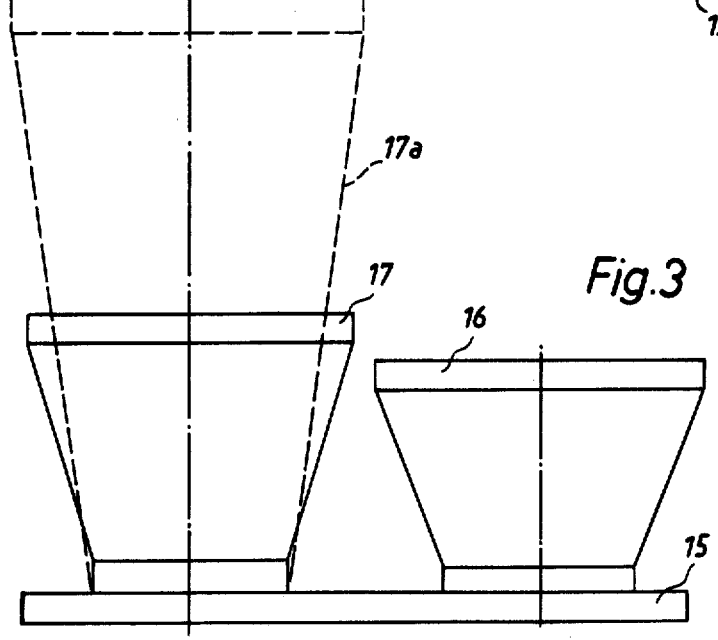
FIG. 3 is a diagrammatic plan view of a turret for two supplemental lenses which can be movably mounted adjacent to the exposed side of the front wall of the housing.

The aforementioned coupling member 7 on the front wall 1a of the housing 1 can be provided in addition to or as a substitute for a plate-like turret 15 (shown in FIG. 3) which can support one or more detachable supplemental lenses 16, 17. As shown in FIG. 3, the lens 17 can be replaced by a lens 17a which is indicated by broken lines. In order to insure a satisfactory distribution of the combined weight of the lenses 16, 17 or 16, 17a, the turret 15 is preferably dimensioned in such a way that it can overlap the entire front wall 1a of the housing 1. This turret is movable between several positions in one of which the lens 16 is located in front of the base objective 3 and in another of which the base objective 3 registers with the lens 17 or 17a. The manner in which the turret 15 can be movably secured to the front wall 1a forms no part of the invention.

The aforediscussed distribution of parts in the housing 1 renders it possible to reduce the dimensions of the housing without affecting the versatility and/or handiness of the still camera. The compactness of the housing 1 is attributable to a substantial extent to the feature that a portion of or the entire base objective 3 is mounted in the chamber 102 in front of the intermediate section 2c of the cassette 2 and that the eyepiece 10 of the viewfinder is installed between the section 2b and the side wall 1d. The compactness of the housing 1 is further enhanced by mounting the transducer 12 behind the second mirror 9 of the viewfinder and by mounting the electric circuit 18 of the exposure control system between the optical elements 5, 6, 8, 9 of the viewfinder and the section 2b of the cassette 2.

The camera can be used without supplemental lenses, i.e., only with the base objective 3 which need not extend all the way to or beyond the front wall 1a of the housing 1. This also contributes to compactness of the housing. The turret 15 is desirable when the camera is to be used with several supplemental lenses at least one of which has a substantial length so that the turret insures a more uniform distribution of the weight and allows for more convenient manipulation of the camera during picture taking.

As mentioned before, each of the mirrors 5 and 9 may be of the partly light-transmitting type or each thereof may comprise totally light-reflecting and totally light-transmitting portions. In the embodiment of FIG. 1, the mirror 5 is assumed to be of the partly light-reflecting type and the mirror 9 (see FIG. 2) is assumed to have totally light-reflecting and totally light-transmitting portions.

The rear wall 1b, the side wall 1c or the bottom wall (not shown) of the housing 1 is preferably pivotable between open and closed positions or is detachable to allow for replacement of the cassette 2 shown in FIG. 1 with a fresh cassette.

The exposure control can be constructed according to German Pat. No. 1,098,356, the turret 15 may be connected to the front wall 1a according to German Pat. No. 1,169,773. The dimensions of the housing 1 may preferably correspond to the dimensions shown in FIG. 1 and 3.

Without further analysis, the foregoing will so fully reveal the gist of the present invention that others can, by applying current knowledge, readily adapt if for various applications without omitting features which fairly constitute essential characteristics of the generic and specific aspects of our contribution to the art and, therefore such adaptations should and are intended to be comprehended within the meaning and range of equivalence of the claims.

What is claimed as new and desired to be protected by Letters Patent is set forth in the appended

1. A still camera, comprising a housing having a front wall provided with a light-admitting opening, a rear wall, and two side walls; a film container removably installed in said housing and having a first section adjacent to one of said side walls, a second section spaced apart from said side walls, and an intermediate section located between said first and second sections adjacent to said rear wall and having a window facing said opening of said front wall, one of said first and second sections being arranged to store a supply of unexposed film and the other of said first and second sections being arranged to store exposed film frames, said first and second sections extending beyond said intermediate section toward said front wall and defining in front of said window and behind said opening a chamber which is open toward said front wall; a base objective at least partially extending into said chamber; a viewfinder having an eyepiece mounted in said housing between said second section of said container and the other of said side walls and optical elements for directing into said eyepiece some of the light which is admitted into said housing by way of said opening, said optical elements including a first mirror located between said objective and said opening and having a surface making with the axis of said objective an angle of 45 degrees, and a second mirror adjacent to said other side wall in front of said eyepiece and having a surface parallel to and facing said surface of said first mirror, each of said mirrors being partially light-reflecting and partially light-transmitting so that a first portion of light which is admitted by way of said opening can reach said objective through said first mirror and a second portion of light which is admitted by way of said opening is deflected by said first mirror against said surface of said second mirror, said second mirror transmitting a first part of said second portion of light and deflecting a second part of said second portion of light into said eyepiece; and exposure control means including photosensitive transducer means installed in said housing behind said second mirror so as to be exposed to said first part of said second portion of light.

2. A still camera as defined in claim 1, wherein one of said mirrors includes a light-reflecting portion and a light-transmitting portion.

3. A camera as defined in claim 1, wherein said first and second sections of said container are spaced apart from said front wall and said optical elements of said viewfinder are installed in said housing in the space located behind said front wall but forwardly of said first and second sections of said container.

4. A camera as defined in claim 3, wherein said exposure control means further includes a portion installed in said housing between said optical elements and said container.

5. A camera as defined in claim 4, wherein said exposure control means further comprises a diaphragm installed in said housing between said objective and opening and means, including said portion of said exposure control means, for adjusting the size of the aperture furnished by said diaphragm as a function of changes in scene brightness.

6. A camera as defined in claim 1, further comprising a compartment for at least one source of electrical energy, said compartment being located between said first mirror and said one side wall of said housing.

7. A camera as defined in claim 6, wherein said compartment is located in front of said first section of said container and at least a portion of said first mirror is nearer to said front wall than said compartment.

8. A camera as defined in claim 1, further comprising coupling means surrounding said opening and secured to said front wall, and a supplemental lens separably connected to said coupling means.

9. A camera as defined in claim 1, further comprising a turret movably secured to said front wall and at least two supplemental lenses mounted on said turret, said turret being movable between first and second positions in which said first and second lenses respectively register with and are located in front of said opening.

10. A camera as defined in claim 9, wherein said turret is movable to a position in which it overlaps at least the major portion of the exposed side of said front wall.

* * * * *